United States Patent [19]
Funk

[11] 4,041,639
[45] Aug. 16, 1977

[54] GAME CALL WITH PEG GUIDED AT FIXED ANGLE TO STRIKING PLATE

[76] Inventor: Eldon E. Funk, R.D. No. 2, Newville, Pa. 17241

[21] Appl. No.: 721,955

[22] Filed: Sept. 10, 1976

[51] Int. Cl.² ............................................. A63H 5/00
[52] U.S. Cl. ................................................. 46/189
[58] Field of Search ........................... 46/189, 174, 190

[56] References Cited

U.S. PATENT DOCUMENTS

| | | | |
|---|---|---|---|
| 1,449,756 | 3/1923 | Jackson | 46/189 |
| 2,511,403 | 6/1950 | Fleener | 46/189 |
| 2,573,856 | 11/1951 | Malone | 46/189 |
| 2,606,401 | 8/1952 | Boatwright | 46/189 |
| 2,643,483 | 6/1953 | Walker | 46/189 |
| 2,958,157 | 11/1960 | Tannehill | 46/177 |
| 3,100,948 | 8/1963 | Tax | 46/189 |
| 3,208,184 | 9/1965 | Wisor | 46/189 |
| 3,716,943 | 2/1973 | Orzetti | 46/189 |
| 3,793,767 | 2/1974 | Pulley | 46/189 |

*Primary Examiner*—F. Barry Shay
*Attorney, Agent, or Firm*—Thomas Hooker

[57] ABSTRACT

A game call having a strike plate mounted in a box and a sounding block held in a stiffly resilient sound-insulating strip moveable back and forth across the top of the box to move the striking point of the peg in the block across the plate and thereby generate a game call. The strip holds the sounding block in a less than 90 degree angular orientation with respect to the plate and at a desired level above the plate. The block and strip may fit together in a manner whereby the block can be removed and can be turned about the peg long axis to equalize wear on the peg end.

10 Claims, 3 Drawing Figures

U.S. Patent   Aug. 16, 1977   4,041,639
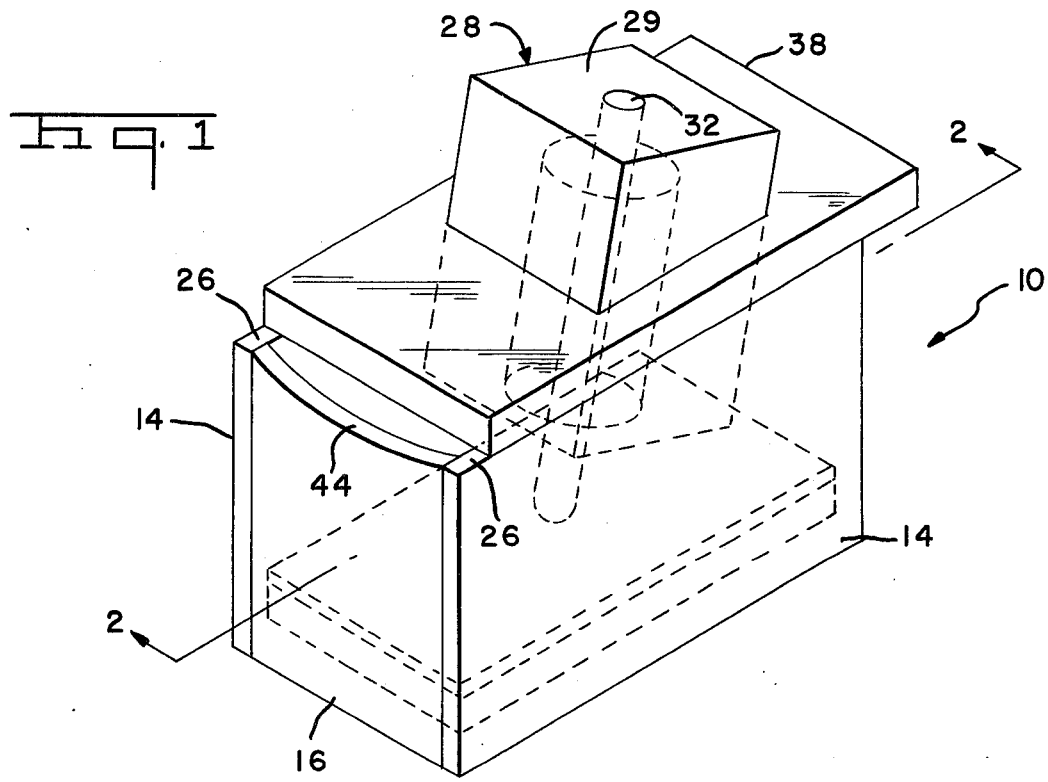
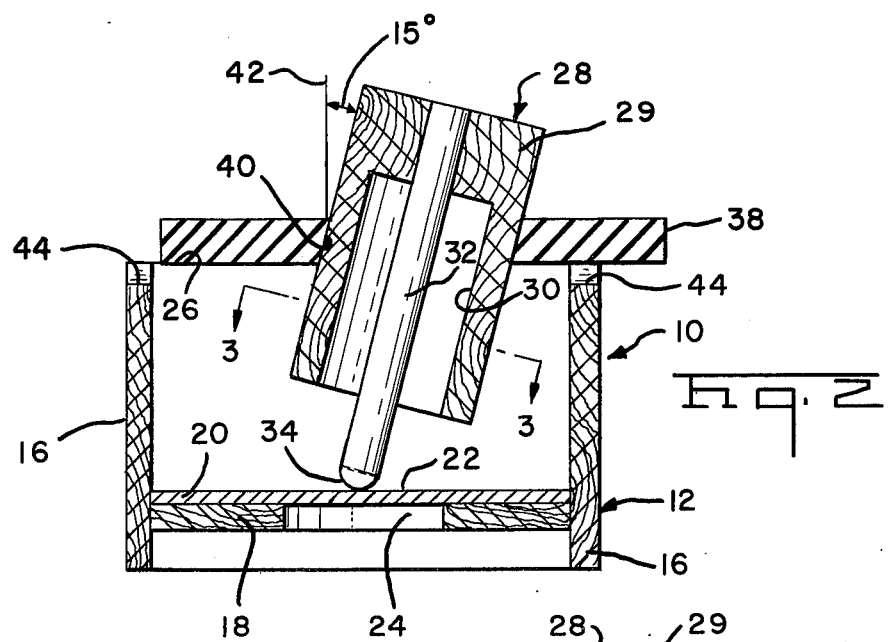
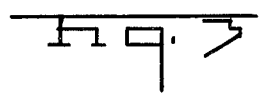

GAME CALL WITH PEG GUIDED AT FIXED ANGLE TO STRIKING PLATE

The invention relates to game calls used by hunters, photographers or others to generate sounds simulating the calls of wild animals and thereby attract the animals. The disclosed game call is of the well known strike-type and is particularly efficient in simulating the call of the wild turkey. Specialized striking blocks are disclosed for generating the calls of the wild gobbler and hen.

Strike-type calls where vibratory members are moved across roughened surfaces are taught by a number of U.S. Patents including U.S. Pat. Nos. 1,034,307; 1,449,756 and 2,025,181. Calls of the type using a sounding block where a vibratory peg extends outwardly of a surrounding bore and includes a striking point are shown in U.S. Pat. Nos. 2,958,157; 3,208,184 and 3,716,943. Various types of striking surfaces, such as chalk, slate, wood and barium ferrite are well known.

In the present invention, the striking plate is mounted on the bottom wall of an open wooden box and the striking block is secured at a desired angle in an opening extending through a flat stiffly resilient sound-insulating mounting strip. The strip is preferably formed of a rubber and has sufficient strength to hold the block in position with the peg oriented at the desired angle to the plate as the strip and sounding block are moved back and forth across the edges of the box and the sound is generated. The sound insulating properties of the strip enhance vibration of the peg and generation of a good call. The strip resiliently engages the block to hold in position at a desired level above the plate but permits the operator to push the block toward or pull it away from the plate during use thereby altering the call as desired. The sounding block is square in cross secton and may be removed from the square opening in the strip and repositioned in the hole in a different orientation to bring a different portion of the striking point on the peg against the plate to compensate for wear. Shallow arculate recesses are provided in the top of the end walls of the box to enhance propagation of the call as the strip sweeps back and forth across the end walls.

Other object and features of the invention will become apparent as the description proceeds, especially when taken in conjunction with the accompanying drawings illustrating the invention, of which there is one sheet.

IN THE DRAWINGS:

FIG. 1 is a perspective view of the game call; and
FIGS. 2 and 3 are sectional views taken along lines 2—2 of FIG. 1 and 3—3 of FIG. 3.

Game call 10 includes a wooden box 12 having side walls 14, end walls 16 and a bottom wall 18. The top of box 12 is open. An aluminum striking plate 20 is positioned on top of bottom wall 18 and includes a roughened striking surface 22 facing the top of the box. A sounding opening 24 is formed in the bottom wall beneath the surface of plate 20. The box 12 is preferably formed of a hard wood, such as cherry.

Sound block 28 is formed from a rectangular block 29 of hard wood, such as cherry, and includes a bore 30 extending inwardly of the block from one end with a vibratory peg 32 mounted in the closed end of the block 29 and extending centrally along bore 30 and outwardly of the bore to a rounded and hardened striking point 34. The peg is also preferably formed from a hard wood. As illustrated in FIGS. 1 and 3, block 29 is square in transverse cross section and includes four side walls 36.

The sounding block 28 is positioned on box 12 by a stiffly resilient sound-insulating mounting strip 38 which rests upon the top edges 26 of side walls 14. While strip 38 is preferably formed from a relatively rigid rubber, other types of materials may be used. The striking block is mounted in a square opening 40 extending through the thickness of the strip 38 above the plate 20. The square opening is oriented at an angle of 15° to a line 42 perpendicular to the strip and to the striking plate so that the peg 32 is positioned at an angle of 15° to the plate. The strip has sufficient strength to hold the peg in this orientation during striking. Hole 40 is made slightly undersized with respect to the square cross section of block 29 so that when the block is inserted into the hole the rubber is stressed and tightly grips the block to hold it at a given position above the striking plate while permitting manual adjustment of the block toward or away from the plate to tune the game call.

Shallow arcuate recesses 44 are formed in the upper edges of end walls 16. During operation of the game call the strip 38 moves back and forth over the recesses.

To operate game call 10, the sounding block is positioned in opening 40 so that the striking point 34 engages the roughened surface 22 of plate 20 with the sides of the strip 38 resting on edges 26. The angled hole 40 orients the sounding block at the optimum 15° angle with respect to the plate. The operator holds the box 12 in one hand and with the other hand moves the sounding block and strip back and forth along edges 26 to push the sounding point across the roughened surface plate 20 and thereby produce the desired call. As the block is moved back and forth, the axis of peg 32 travels in a plane essentially perpendicular to plate 22 and is at an angle to the plate of about 75°. This is the angle of attack of the peg. The characteristics of the call may be changed by varying pressure on the sounding block so that the frictional force between the peg and plate is increased or decreased. The strip 38 is sufficiently resilient to accomodate such variations in pressure while still holding the block at the optimum angle with respect to the plate. The strip also insulates the sounding block from box 12 so that sound is not transmitted from the block to the box. This permits desired independent vibration of the peg. A ridged connection between the sounding block and box will unduly dampen the sound of the call. The recesses 44 are swept by the ends of strip 38 and define sound openings enhancing the call. Sound opening 24 in bottom wall likewise enhances the call.

Protracted use of the sounding block in one position causes wear on the surface of the striking point engaging the plate and resultant deterioration of the call. When this occurs, the operator may remove the sounding block from the opening 40 and reposition it in the opening in a different orientation so that a new hard surface of the sounding block engages the striking plate. In this way, the useful life of the call is increased. Obviously, the exterior cross section of block 29 and of the complementary opening 40 may be polygonal with a number of sides more than four so that the useful life of the block is further extended. Also, it is contemplated that the sounding block may be cylindrical to permit rotation of the block in the strip through a number of positions so that the entire hardened circumference of point 34 is used.

The game call 10 is small and easily carried in the field. Box 12 may have a length of about three and three fourth inch, a width of one and three fourth inch and a heighth of one and three fourth inch with the wall thickness being about three sixteenths inch. I have found that my game call particularly well simulates the call of the wild turkey gobbler when using a sounding block having a bore with a diameter of seven eighths inch extending one and three eighths inch deep into the block and using a one fourth inch diameter peg. The call of the wild turkey hen is particularly well simulated with a similar sounding block having a bore with a diameter of three fourth inch.

While I have illustrated and described preferred embodiments of my invention, it is understood that these are capable of modification, and I therefore do not wish to be limited to the precise details set forth, but desire to avail myself of such changes and alterations as fall within the purview of the following claims.

What I claim my invention is:

1. A game call of the type having a striking plate, supports on either side of the plate with edges parallel to the plate, a peg block having a bore extending inwardly from one end thereof with a vibratory peg centrally located in the bore extending from the closed end of the bore past the end of the block and having a rounded striking point at the free end thereof so as to produce a simulated call when moved across the striking plate, wherein the improvement comprises a stiffly resilient sound-insulating mounting strip resting on the edges of the supports above the striking plate, a central block-orienting opening extending through the thickness of the strip above the plate, the peg block being mounted within the opening with the striking point of the peg engaging the plate and with the block held by the strip at an angle of attack of less than 90° relative to the surface of the plate, whereby movement of the strip and block back and forth along the edges of the supports moves the striking point of the peg back and forth across the plate to produce a sound simulating a game call while the strip insulates transmission of sound between the block and supports.

2. A game call as in claim 1 wherein the strip is formed of a rubber.

3. A game call as in claim 1 wherein the opening extends through the strip at an angle of about 15° from a line perpendicular to the plate.

4. A game call as in claim 3 wherein the portion of the mounting strip surrounding the block resiliently engages the block to hold it in a fixed position above the plate.

5. A game call as in claim 4 wherein the opening and block are both polygonal in shape whereby the block may be positioned in an opening in a number of different orientations to locate different portions on the striking point against the plate.

6. A game call as in claim 5 for simulating the call of a wild turkey gobbler wherein the peg block is made of hard wood, the pin is about one fourth inch in diameter, the depth of the bore is about one and three eighths inch and the diameter of the bore is about seven eighths inch.

7. A game call as in claim 5 for simulating the call of a wild turkey hen wherein the pin is about one fourth inch in diameter, the depth of the bore is about one and three eighths inch and the diameter of the bore is about three fourths inch.

8. A game call as in claim 5 wherein the striking plate and supports form the bottom and sides of a box having end walls, recesses in the top edges of the end walls adjacent the edges of the sides of the box defining sounding openings at the ends of the box.

9. A game call as in claim 8 wherein said strip extends over said openings as the block is moved back and forth across the striking plate and wherein the openings are shallow arcs.

10. A game call as in claim 9 wherein the striking plate is made of aluminum with a roughened striking surface.

* * * * *